(12) United States Patent
Isoda

(10) Patent No.: US 7,690,461 B2
(45) Date of Patent: Apr. 6, 2010

(54) ALL TERRAIN VEHICLE

(75) Inventor: Takashi Isoda, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1083 days.

(21) Appl. No.: 11/142,595

(22) Filed: Jun. 1, 2005

(65) Prior Publication Data

US 2006/0272872 A1    Dec. 7, 2006

(51) Int. Cl.
*B60K 11/00* (2006.01)
*B62M 7/00* (2006.01)

(52) U.S. Cl. ........................ 180/68.3; 180/219

(58) Field of Classification Search ........... 180/68.1, 180/68.2, 908, 68.3, 292, 233
See application file for complete search history.

(56) References Cited

U.S. PATENT DOCUMENTS

| | | | | |
|---|---|---|---|---|
| 4,484,651 A | * | 11/1984 | Hattori et al. | 180/225 |
| 4,907,552 A | * | 3/1990 | Martin | 123/198 E |
| 5,613,569 A | * | 3/1997 | Sugioka et al. | 180/68.5 |
| 5,967,127 A | * | 10/1999 | Okawada et al. | 123/572 |
| 6,438,949 B1 | * | 8/2002 | Nozaki | 60/322 |
| 6,644,693 B2 | * | 11/2003 | Michisaka et al. | 280/835 |
| 6,722,323 B2 | * | 4/2004 | Kawamoto | 123/54.4 |
| 6,823,956 B2 | * | 11/2004 | Shimizu | 180/68.1 |
| 7,004,276 B2 | * | 2/2006 | Iizuka et al. | 180/89.17 |
| 2006/0230728 A1 | * | 10/2006 | Tsuruta et al. | 55/385.3 |

FOREIGN PATENT DOCUMENTS

JP    2005-001508    1/2005

* cited by examiner

*Primary Examiner*—S. Joseph Morano
*Assistant Examiner*—Bridget Avery
(74) *Attorney, Agent, or Firm*—Keating & Bennett, LLP

(57) ABSTRACT

An all terrain vehicle is constructed to prevent rainwater or the like from entering an inner portion of an air cleaner without complicating the structure of the vehicle or making the assembly work difficult, while improving the external appearance of the vehicle. An air cleaner is provided below a seat, and the air cleaner is positioned between left and right rail main bodies when viewed from above. Left, right, bottom and rear surfaces of the air cleaner are covered with an undercover, which is separate from the air cleaner.

17 Claims, 12 Drawing Sheets

ALL TERRAIN VEHICLE

BACKGROUND OF THE INVENTION

1. Field of the Invention

The present invention relates to an all terrain vehicle, and more specifically, to an all terrain vehicle including an air cleaner in a rear portion of a body frame.

2. Description of the Related Art

One known type of all terrain vehicle described in, for example, Japanese Laid-Open Patent Publication No. 2005-1508, has the following structure. An air cleaner case is provided at a position which is below a seat and above the rear wheels. Left and right rear fender main bodies are connected to each other in the width direction of the vehicle via side plates, bottom plates and rear plates thereof, and a carrying case is formed by these connecting elements. A labyrinth structure is formed by a front edge of the carrying case and a rear edge of the air cleaner case.

In a structure in which the air cleaner case is located above the rear wheels, rainwater or the like is splashed by the rear wheels and collides with the air cleaner case and elements in the vicinity thereof. On some occasions, the rainwater or the like may be splashed even onto a top surface of the air cleaner case and enter an inner portion of the air cleaner case. In the above-described all terrain vehicle, the carrying case is formed by the elements connecting the left and right rear fender main bodies, and the labyrinth structure is formed by the front edge of the carrying case and the rear edge of the air cleaner case, so that the labyrinth structure prevents the rainwater or the like from entering the inner portion of the air cleaner case. However, the labyrinth structure causes problems such as complicating the structure of the vehicle and making the assembly work difficult.

SUMMARY OF THE INVENTION

In order to overcome the problems described above, preferred embodiments of the present invention provide an all terrain vehicle capable of preventing rainwater or the like from entering an inner portion of an air cleaner without complicating the structure of the vehicle or making the assembly work difficult, while improving the external appearance of the vehicle.

An all terrain vehicle according to a preferred embodiment of the present invention includes left and right rear wheels, a seat rail including left and right rail main bodies which are provided between the left and right rear wheels when viewed from above, a seat arranged to cover atop surface of the seat rail, an air cleaner provided below the seat, and located between the left and right rail main bodies when viewed from above, and an undercover separated from the air cleaner for covering left, right, bottom and rear surfaces of the air cleaner.

According to the all terrain vehicle of preferred embodiments of the present invention, the bottom surface of the air cleaner is covered with the undercover. Therefore, rainwater, muddy water, dirt, debris, or the like splashed from the rear wheels collides with the undercover and drops down. Therefore, the rainwater, muddy water, dirt, debris, or the like can be prevented from dropping on the top surface of the air cleaner after moving along the rear wall of the air cleaner or the like and thus entering the inner portion of the air cleaner. The present invention adopts the simple structure of covering the bottom surface of the air cleaner with the undercover. Therefore, the problem of the complicated structure, which is caused by the labyrinth structure, does not arise. In addition, since the left and right surfaces of the air cleaner are covered with the undercover, the external appearance of the all terrain vehicle when viewed from the side is improved.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Hereinafter, the present invention will be described by way of preferred embodiments with reference to the attached drawings.

FIG. 1 through FIG. 11 are views illustrating an all terrain vehicle according to a preferred embodiment of the present invention. In this preferred embodiment, the terms "front", "forward", "rear", "rearward", "left", "right", "behind" and "side" refer to directions from the point of view of a rider sitting on a seat of the all terrain vehicle.

Figure 1:
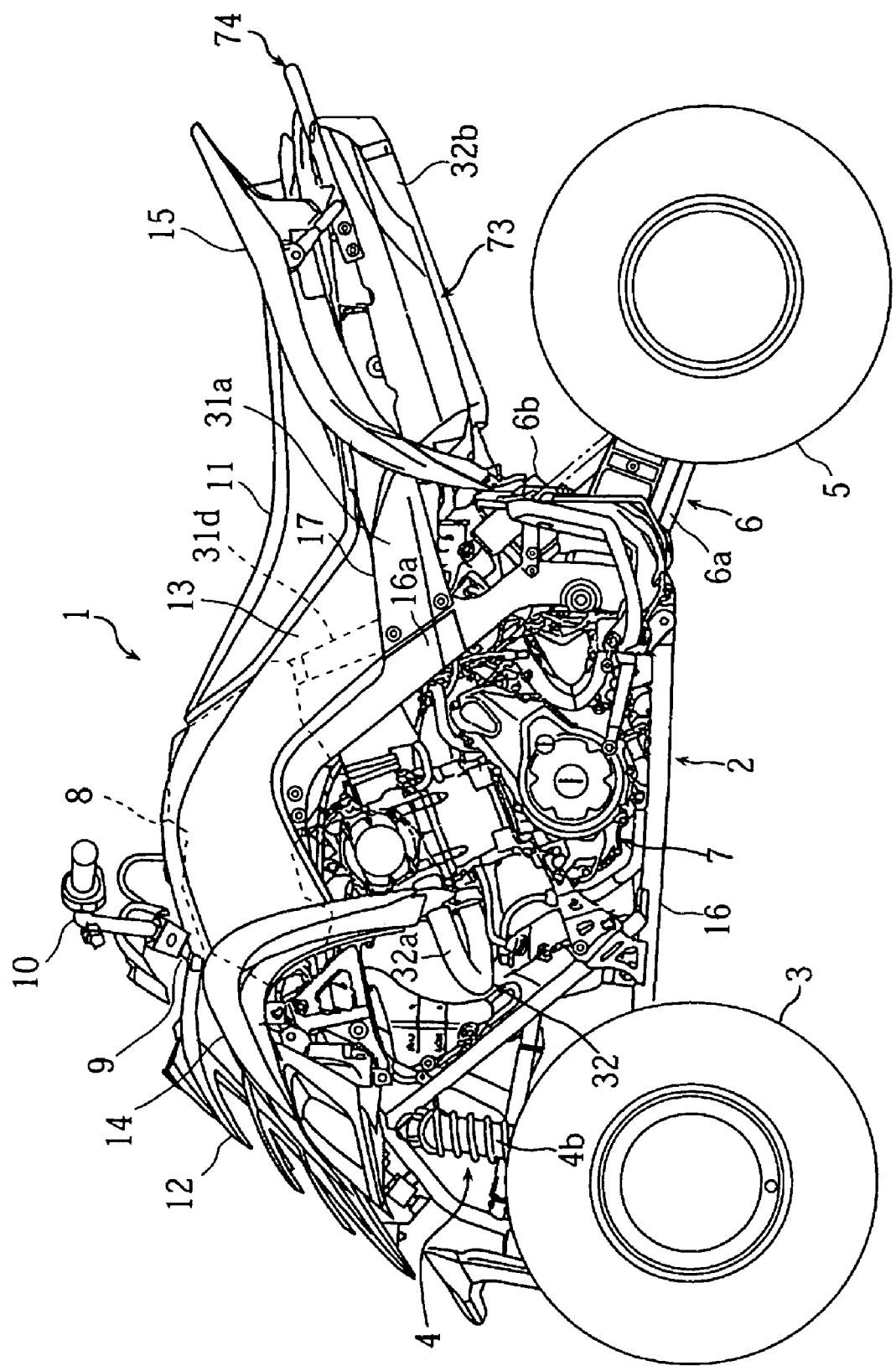
FIG. 1 is a side view of an all terrain vehicle according to one preferred embodiment of the present invention.
Figure 2:
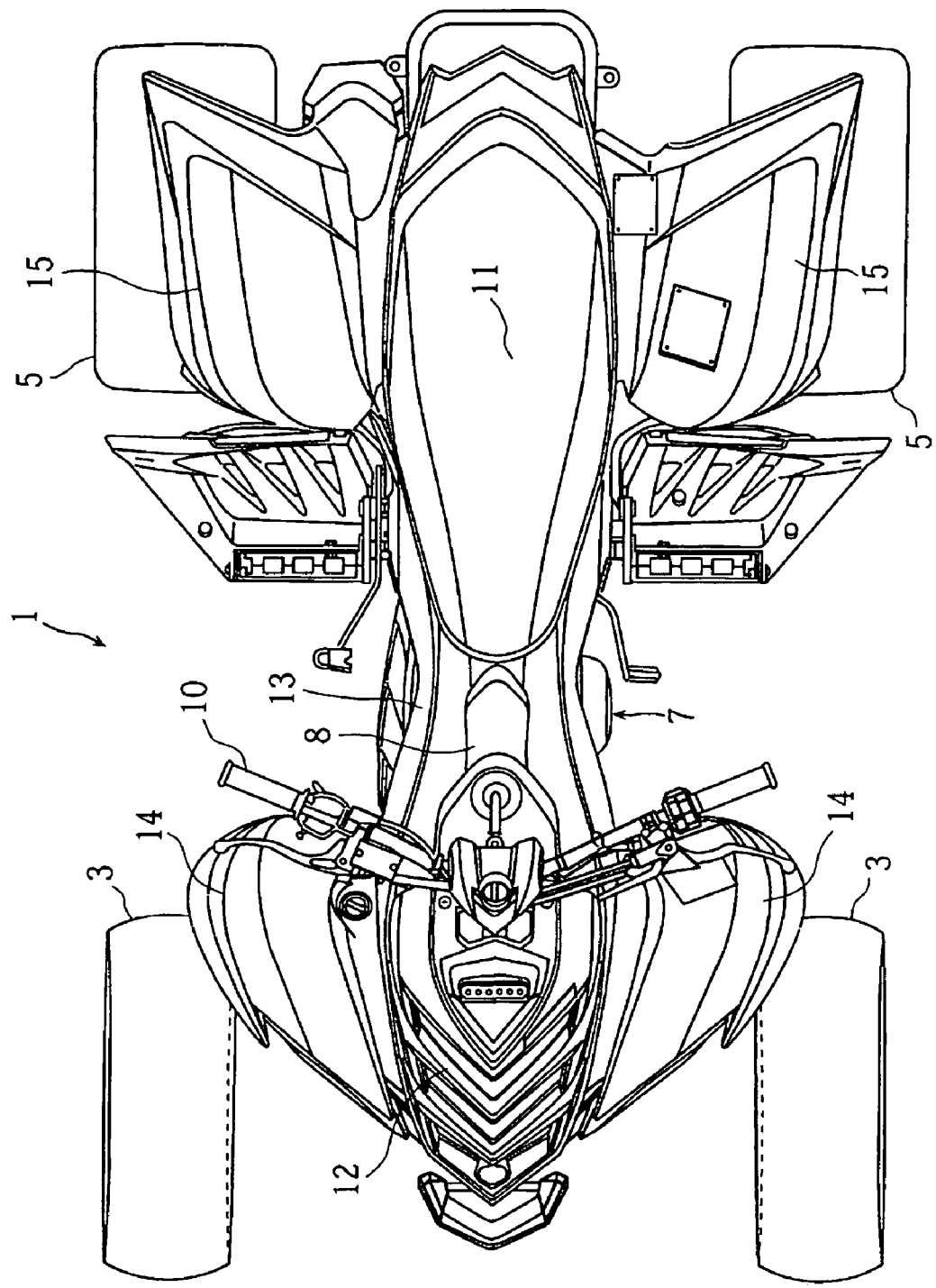
FIG. 2 is a plan view of the all terrain vehicle shown in FIG. 1.

In FIG. 1 through FIG. 11, reference numeral 1 represents an all terrain vehicle according to the present preferred embodiment. The all terrain vehicle 1 preferably has the following structure. With reference to FIG. 1 and FIG. 2, the all terrain vehicle 1 preferably includes a double-cradle type body frame 2. By left and right ends of a front edge of the body frame 2, left and right front wheels 3 are respectively supported via left and right front suspension devices 4, so as to be swingable upward and downward. Each front wheel 3 has a balloon tire having a low air pressure and has a large width. By left and right ends of a rear edge of the body frame 2, left and right rear wheels 5 similar to the front wheels 3 are respectively supported via a rear suspension device 6, so as to be swingable upward and downward. In the cradle of the body frame 2, an engine unit 7 is mounted. Above the engine unit 7, a fuel tank 8 is mounted. Forward of the fuel tank 8, a steering shaft 9 for steering the left and right front wheels 3 is provided so as to be pivotable rightward and leftward. A steering handle 10 is fixed to a top end of the steering shaft 9. Rearward of the fuel tank 8, a seat 11 is provided. A front portion of the steering shaft 9 is covered with a front cover 12. Left and right portions of the fuel tank 8 and lower left and right portions of the seat 11 are covered with side covers 13. Above the left and right front wheels 3, left and right front fenders 14 are provided. Above the left and right rear wheels 5, left and right rear fenders 15 are provided.

Figure 3:
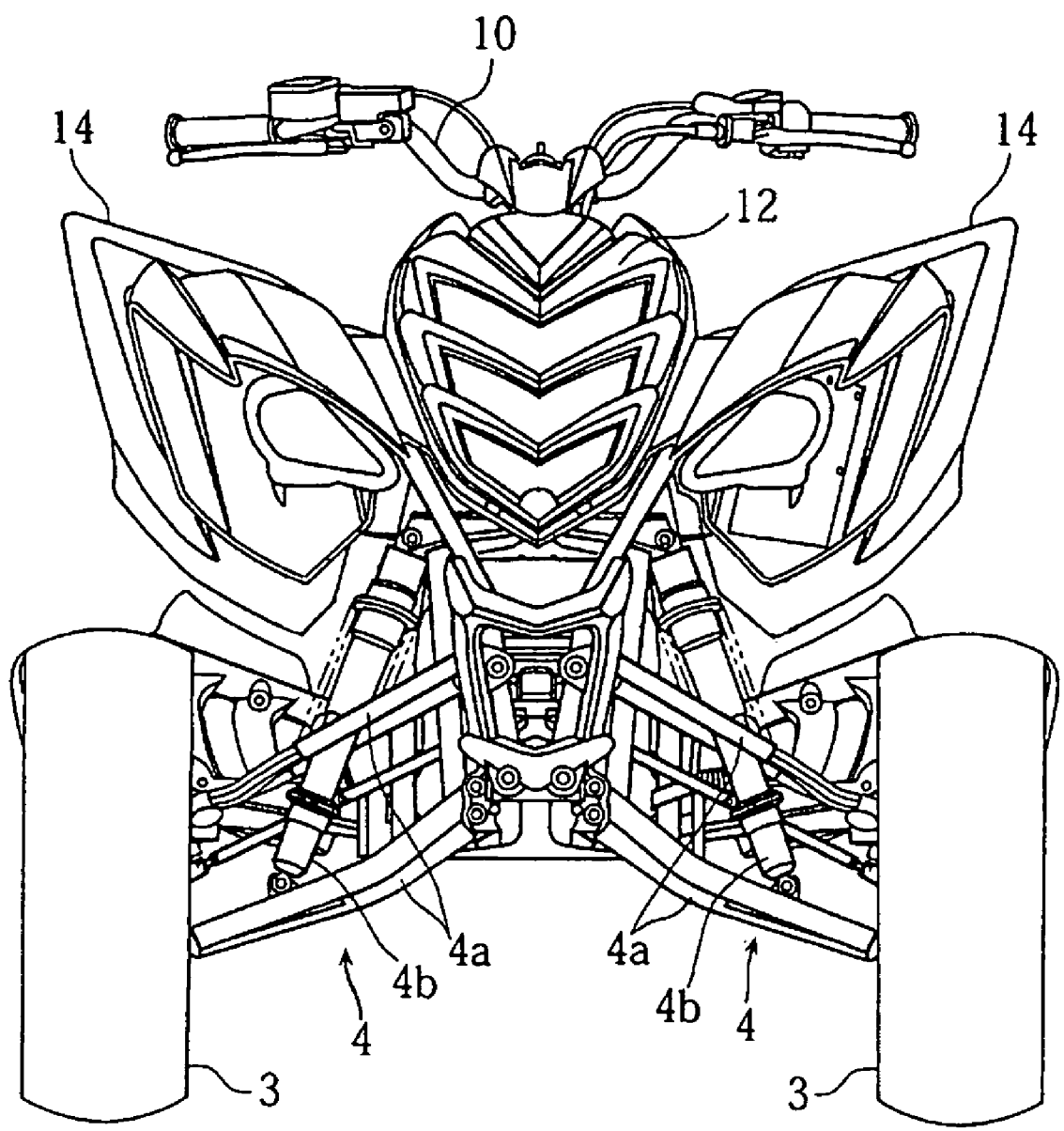
FIG. 3 is a front view of the all terrain vehicle shown in FIG. 1.

As shown in FIG. 3, each front suspension device 4 includes top and bottom front arms 4a and a cushion unit 4b. The top and bottom front arms 4a are supported by a front portion of the body frame 2 so as to be swingable upward and downward, and support the corresponding front-wheel 3. The cushion unit 4b is located between the bottom front arm 4a and the body frame 2.

Figure 4:
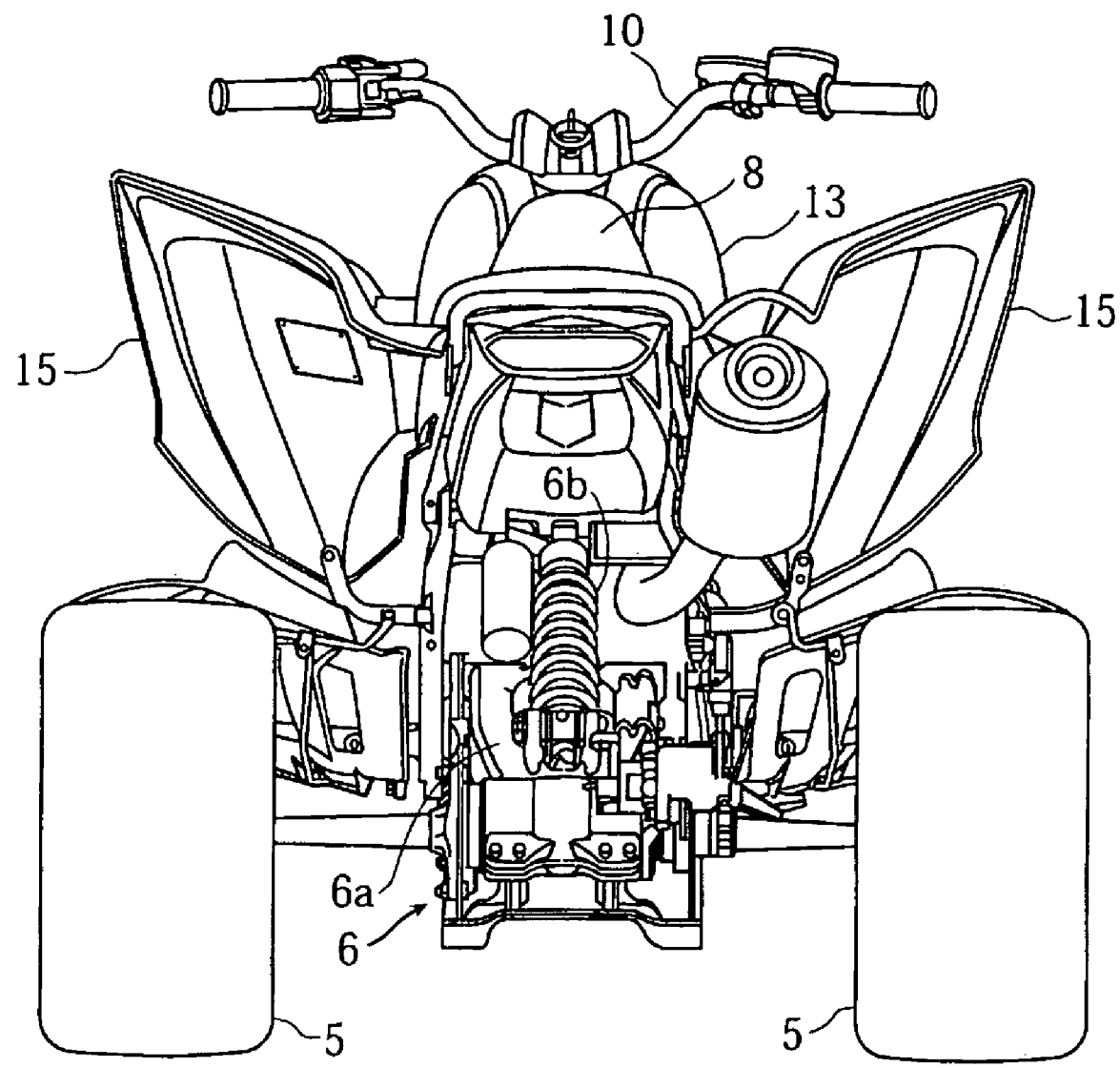
FIG. 4 is a rear view of the all terrain vehicle shown in FIG. 1.

As shown in FIG. 4, the rear suspension device 6 includes a rear arm 6a and a cushion unit 6b. The rear arm 6a is supported by a rear portion of the body frame 2 so as to be swingable upward and downward, and supports the rear wheels 5. The cushion unit 6b is provided between the rear arm 6a and the body frame 2, and is located at the center in a width direction of the all terrain vehicle 1. In this specification, the "width direction" is a direction that is substantially parallel to the phantom straight line connecting the centers of the left and right front wheels 3 or the centers of the left and right rear wheels 5. The "longitudinal direction" is a horizontal direction that is substantially perpendicular to the width direction.

Figure 12:
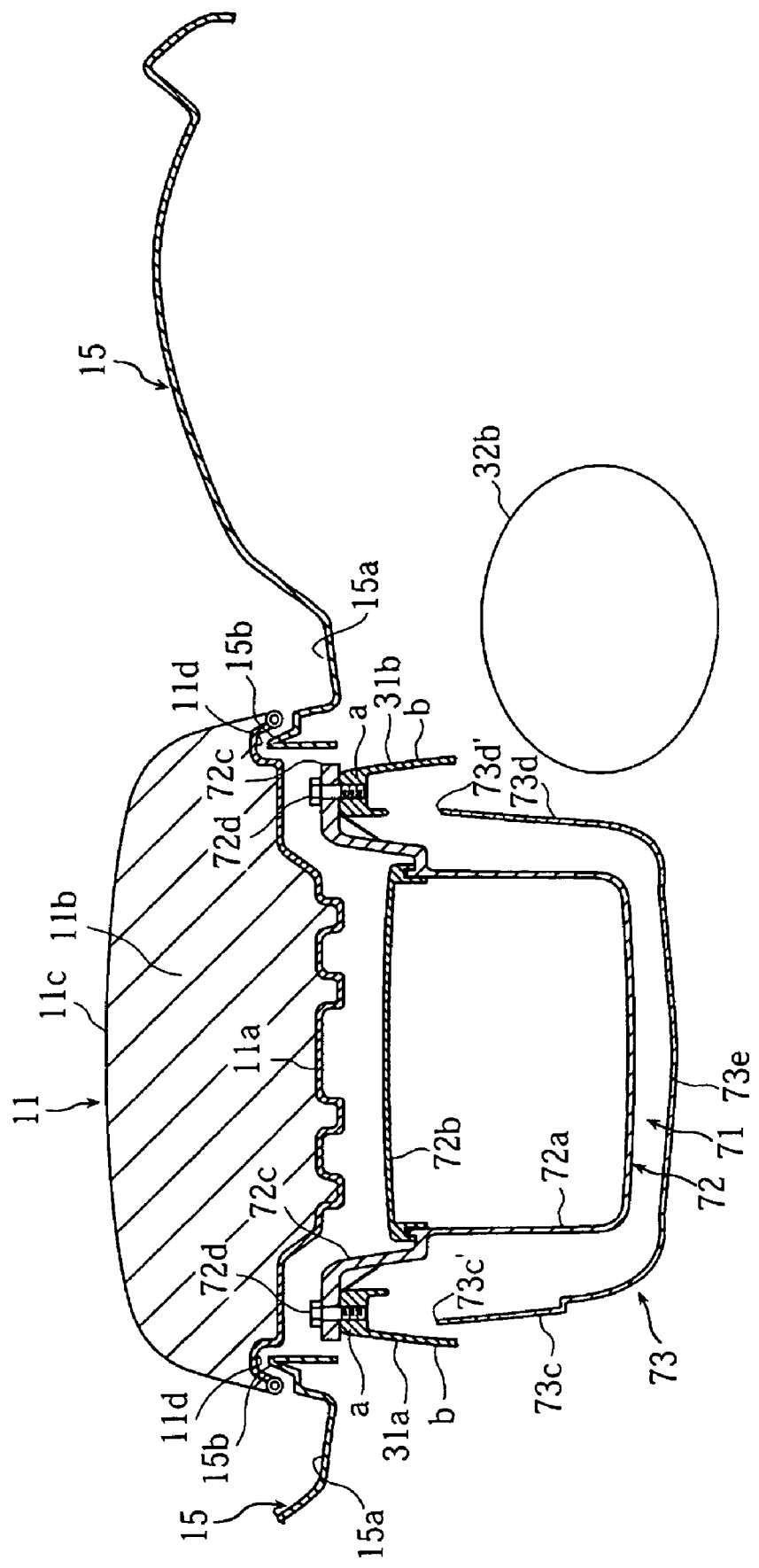
FIG. 12 is a cross-sectional view of an air cleaner and the undercover taken along line XII-XII of FIG. 10 and viewed from behind.

The seat 11 has the structure shown in FIG. 12. A cushion material 11b is provided on a bottom plate 11a. The cushion material 11b is covered with a surface layer 11c, and a periphery of the surface layer 11c is fixed to a periphery of the bottom plate 11a.

The bottom plate 11a has a groove 11d extending along each of left and right edges thereof. Each groove 11a extends in a longitudinal direction of the all terrain vehicle 1, and is recessed upward. The left and right rear fenders 15 each have a gutter-like groove 15a extending along the corresponding side edge of the seat 11. Each gutter-like groove 15a is provided for allowing rainwater or the like to flow in the longitudinal direction. An inner wall 15b of each rear fender 15 protrudes upward like a rib. Each inner wall 15b is located in the corresponding groove 1d of the bottom plate 11a of the seat 11.

As a result of the features of the above-described structure, rainwater or the like dropping on the rear fenders 15 flows in the grooves 15a in the longitudinal direction and thus, substantially never flows to an area below the seat 11.

The body frame 2 includes a main frame 16 (FIG. 1) for supporting the engine unit 7, the front suspension devices 4 and the rear suspension device 6, and a seat rail 17 (FIG. 5) attached to the main frame 16 for supporting the seat 11.

The seat rail 17 is provided for bearing the load acting on the seat 11, for example, the body weight of the rider. The seat rail 17 is detachably provided on a rear arm supporting section 16a of the main frame 16.

Figure 7:
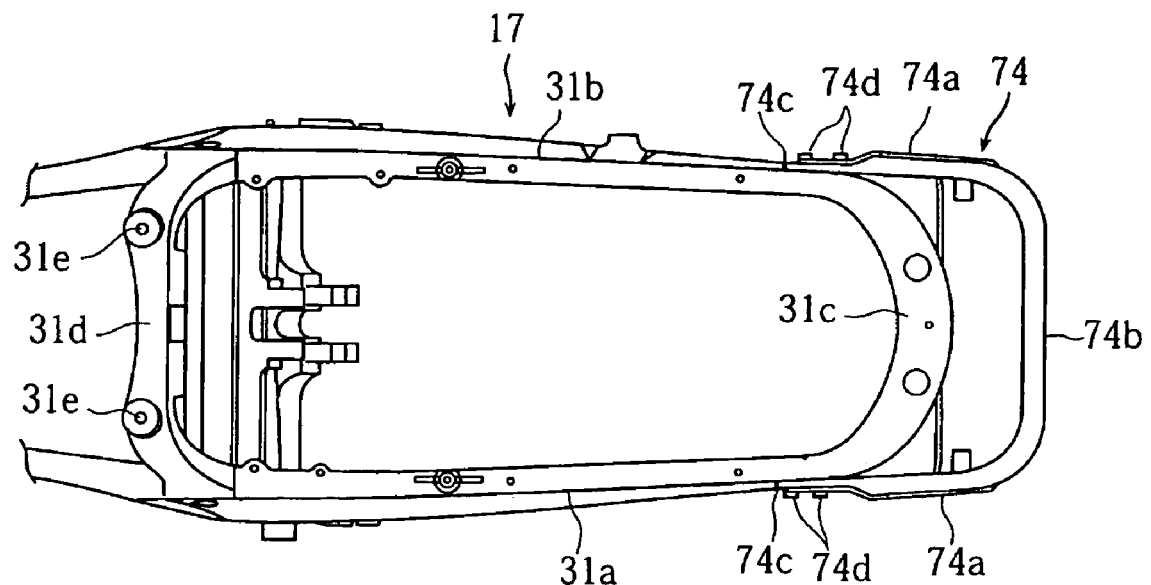
FIG. 7 is plan view of a seat rail of the all terrain vehicle shown in FIG. 1.

The seat rail 17 is preferably molded of an aluminum alloy, and preferably has a substantially rectangular shape when viewed from above as shown in FIG. 7. The seat rail 17 includes a left rail main body 31a and a right rail main body 31b both extending in the longitudinal direction, a rear portion 31c for connecting rear ends of the left and right rail main bodies 31a and 31b, and a front portion 31d for connecting front ends of the left and right rail main bodies 31a and 31b. The front portion 31d is curved to protrude upward like a gate.

On a top surface of the front portion 31d, supporting bosses 31e are formed for supporting a rear portion of the fuel tank 8.

To a rear portion of the seat rail 17, a rear bumper 74 is attached. The rear bumper 74 is preferably formed by bending a metal pipe into a substantially C-shaped configuration having left and right portions 74a and a rear portion 74b, and then forming attachment bosses 74c respectively at front ends of the left and right portions 74a. The rear bumper 74 is arranged to partially surround the rear portion of the seat rail 17 from behind when viewed from above, and to slightly incline upward and rearward with respect to the left and right rail main bodies 31a and 31b when viewed from the side of the all terrain vehicle 1. The attachment bosses 74c of the rear bumper 74 are detachably attached to rear portions of the rail main bodies 31a and 31b by bolts 74d.

Figure 5:
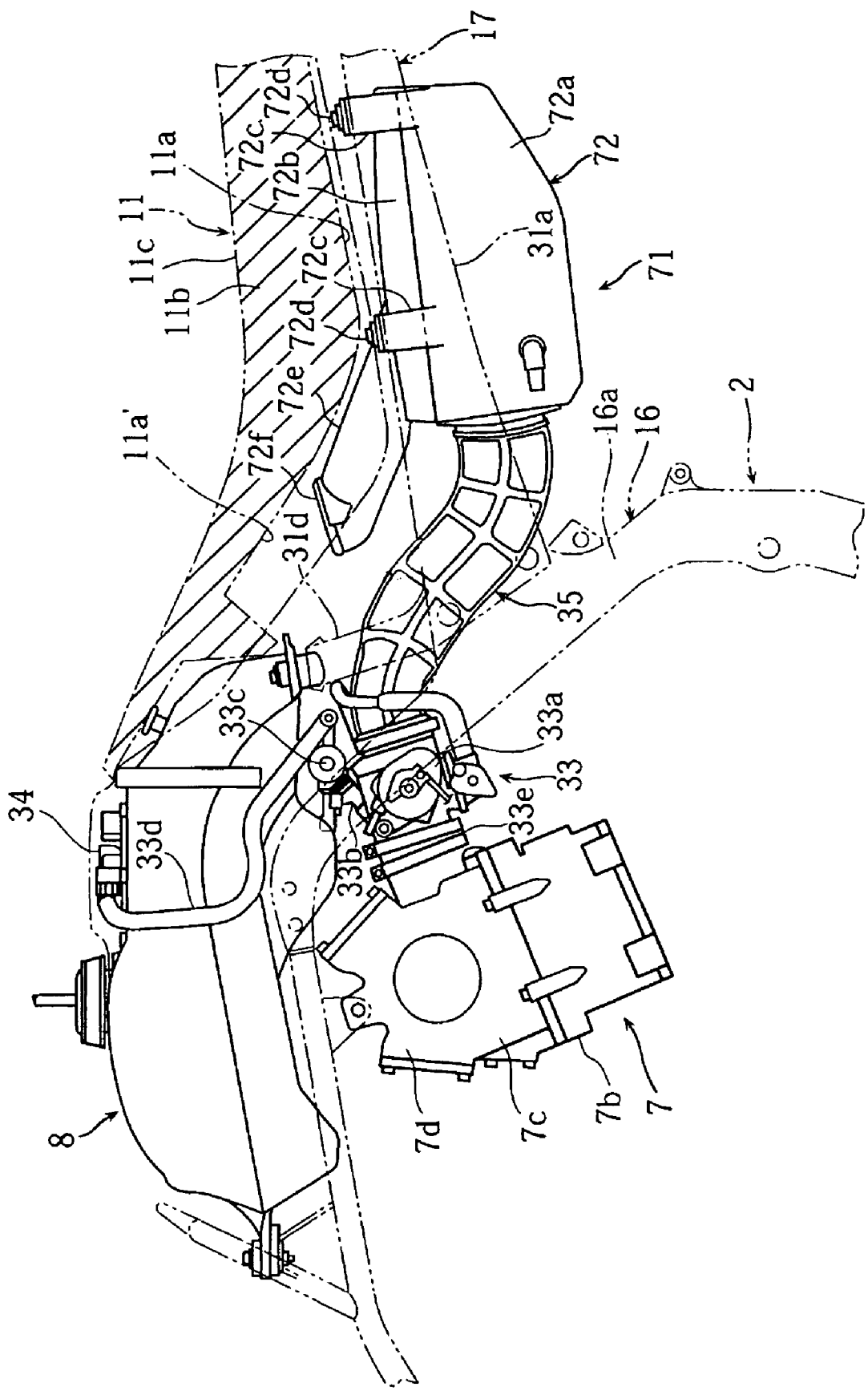
FIG. 5 is a side view of an intake system and the vicinity thereof of the all terrain vehicle shown in FIG. 1.

As best shown in FIG. 5, the engine unit 7 includes a crank case for accommodating a crank shaft, and a cylinder block 7b, a cylinder head 7c and a head cover 7d which are stacked on a top wall of a front portion of the crank case. The crank case, the cylinder block 7b, the cylinder head 7c, and the head cover 7d are tightened to each other by bolts.

A front wall of the cylinder head 7c has an exhaust port, and an exhaust pipe 32a (FIG. 1) of an exhaust system 32 is connected to the exhaust port. The exhaust pipe 32a extends forward, is bent right-rearward, passes on the right of the cylinder block 7b, and extends rearward below the right rail main body 31b of the seat rail 17.

Figure 13:
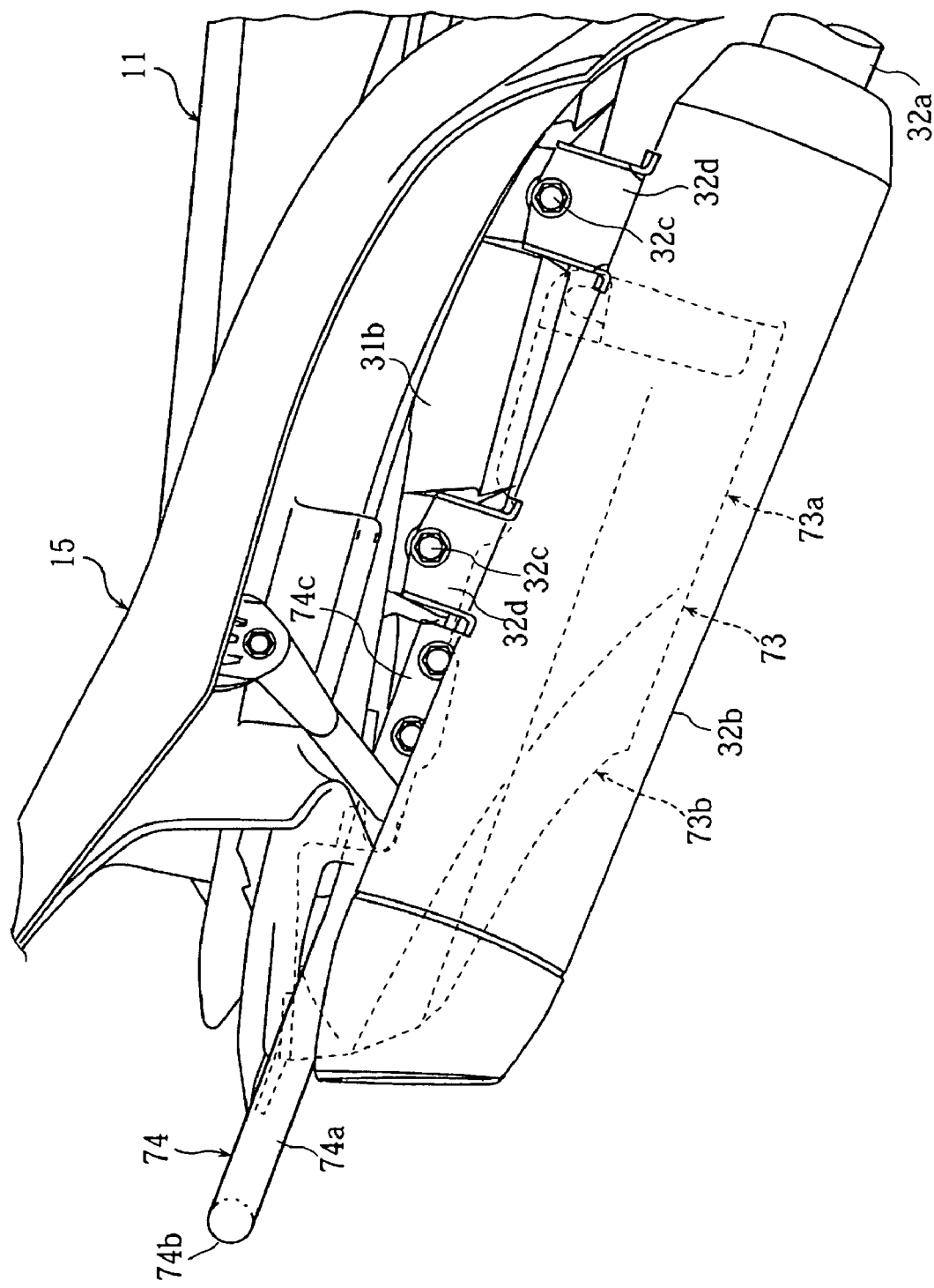
FIG. 13 is a right side view of a rear portion of the all terrain vehicle shown in FIG. 1.

As best shown in FIG. 13, a muffler 32b having a larger diameter than that of the exhaust pipe 32a is connected to a rear end of the exhaust pipe 32a. The muffler 32b passes below the right rear fender 15 and extends along the right rail main body 31b. The muffler 32b is fixed to the right rail main body 31b by a bolt 32c via a bracket 32d. The muffler 32b preferably has an elliptical cross section which is longer in the horizontal direction than in the vertical direction (FIG. 12). As a result of such a shape, the muffler 32b has a necessary volume as a muffler and still is prevented from protruding downward. Thus, the upward and downward swinging strokes of the rear wheels 5 can be guaranteed by the cushion device 6b while the height of the body of the all terrain vehicle 1 in the upward-downward direction is limited.

As best shown in FIG. 5, a rear wall of the cylinder head 7c has an intake port, and a throttle body 33a of an intake system 33 is attached to the intake port via a joint member 33e. In the throttle body 33a, a throttle valve is provided for controlling the dimensional area of an intake passage. A fuel injection valve 33b is provided on a top wall of the throttle body 33a so as to incline up rearward. The fuel injection valve 33b injects the fuel toward the intake port. A fuel supply rail 33c extending generally horizontally in the width direction of the all terrain vehicle 1 is connected to a fuel introduction opening formed at a top end of the fuel injection valve 33b. One end of the fuel supply rail 33c is connected to a discharge opening of a fuel supply pump 34 provided in the fuel tank 8 via a fuel supply hose 33d.

A portion of a bottom wall of the fuel tank 8 which corresponds to a bottom end of the fuel supply pump 34 protrudes downward. The protruding portion is located in a space formed by the head cover 7d of the engine unit 7, the throttle body 33a, and fuel injection valve 33b and the like.

Figure 6:
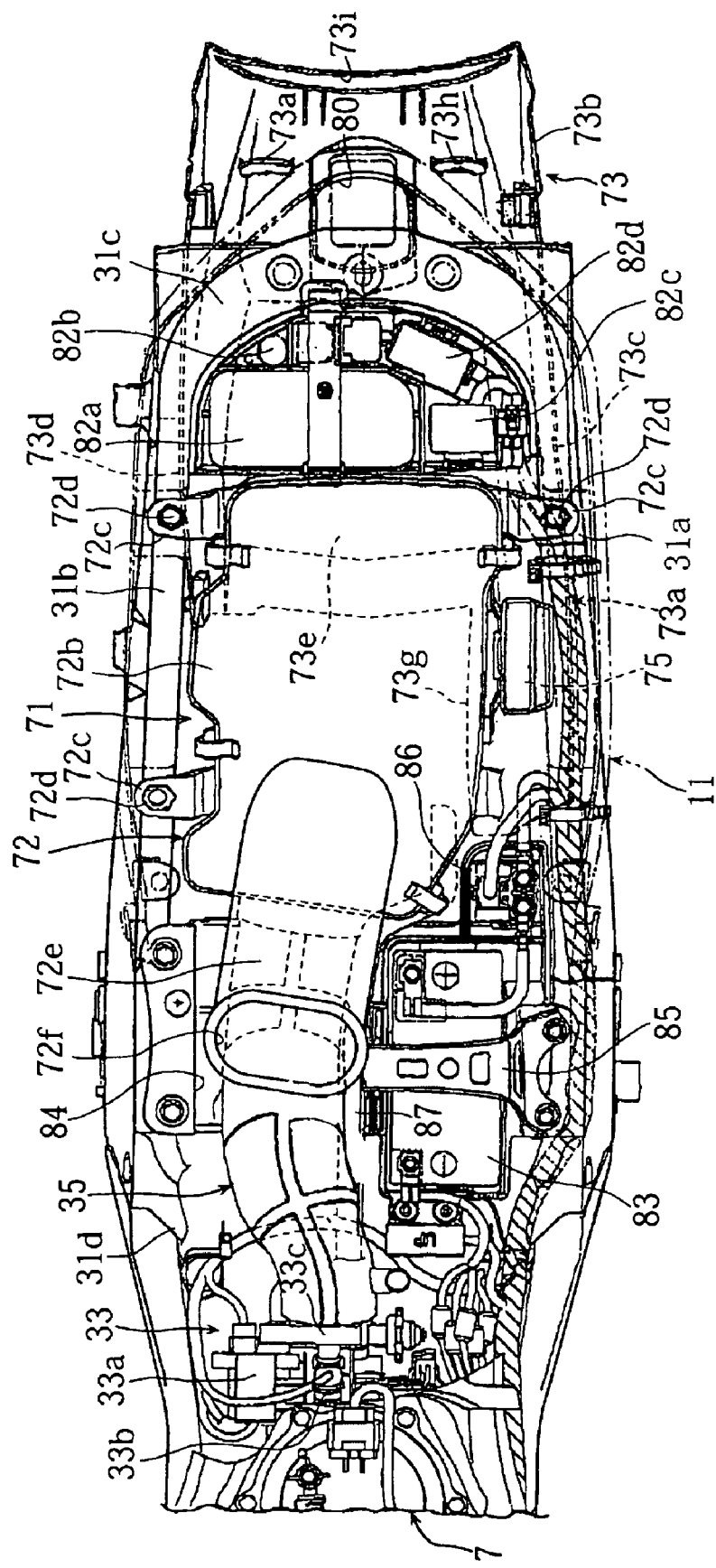
FIG. 6 is a plan view of the intake system and the vicinity thereof of the all terrain vehicle shown in FIG. 1.

As best shown in FIG. 6, an air cleaner 71 is connected to the throttle body 33a via an intake duct 35. The intake duct 35 is preferably formed of a resin or rubber, and is gradually bent downward from the throttle body 33a and then is bent rearward. The intake duct 35 is located between the left and right rail main bodies 31a and 31b and on the right of the center line of the all terrain vehicle 1 in the width direction, when viewed from above (FIG. 6).

On the left of the intake duct 35, a battery 83 is provided. The battery 83 is accommodated in a supporting box 84. The supporting box 84 is arranged so as to bridge between the left and right rail main bodies 31a and 31b. The battery 83 is fixed to the supporting box 84 via a bracket 85, and an insulating cover sheet is provided between the battery 83 and the bracket 85. Reference numeral 86 represents a starter relay. Reference numeral 87 represents a cover sheet for covering the battery 83.

The air cleaner 71 is preferably a generally parallelepiped box formed of a resin. The air cleaner 71 includes an air cleaner case 72 and a filtering element (not shown) provided in the air cleaner case 72. As best shown in FIG. 12, the air cleaner case 72 includes a case main body 72a defining a lower portion and a case lid 72b defining an upper portion. On left and right walls of the case main body 72a, flanges 72c extending upward and then outward are respectively provided. The flanges 72c are preferably integrally formed with the case main body 72a. The flanges 72c are located on the left and right rail main bodies 31a and 31b, respectively and are fixed to the left and right rail main bodies 31a and 31b by bolts 72d.

An air introduction duct 72e (FIG. 5) is integrally formed with the case lid 72b. As shown in FIG. 5, the air introduction duct 72e extends upward and forward obliquely from the case lid 72d. In more detail, the air introduction duct 72e extends forward obliquely along the front portion 11a', which inclines upward and forward obliquely, of the bottom plate 11a of the seat 11. An opening 72f of the air introduction duct 72e is located at about the same height as a top surface of the engine unit 7.

Figure 10:
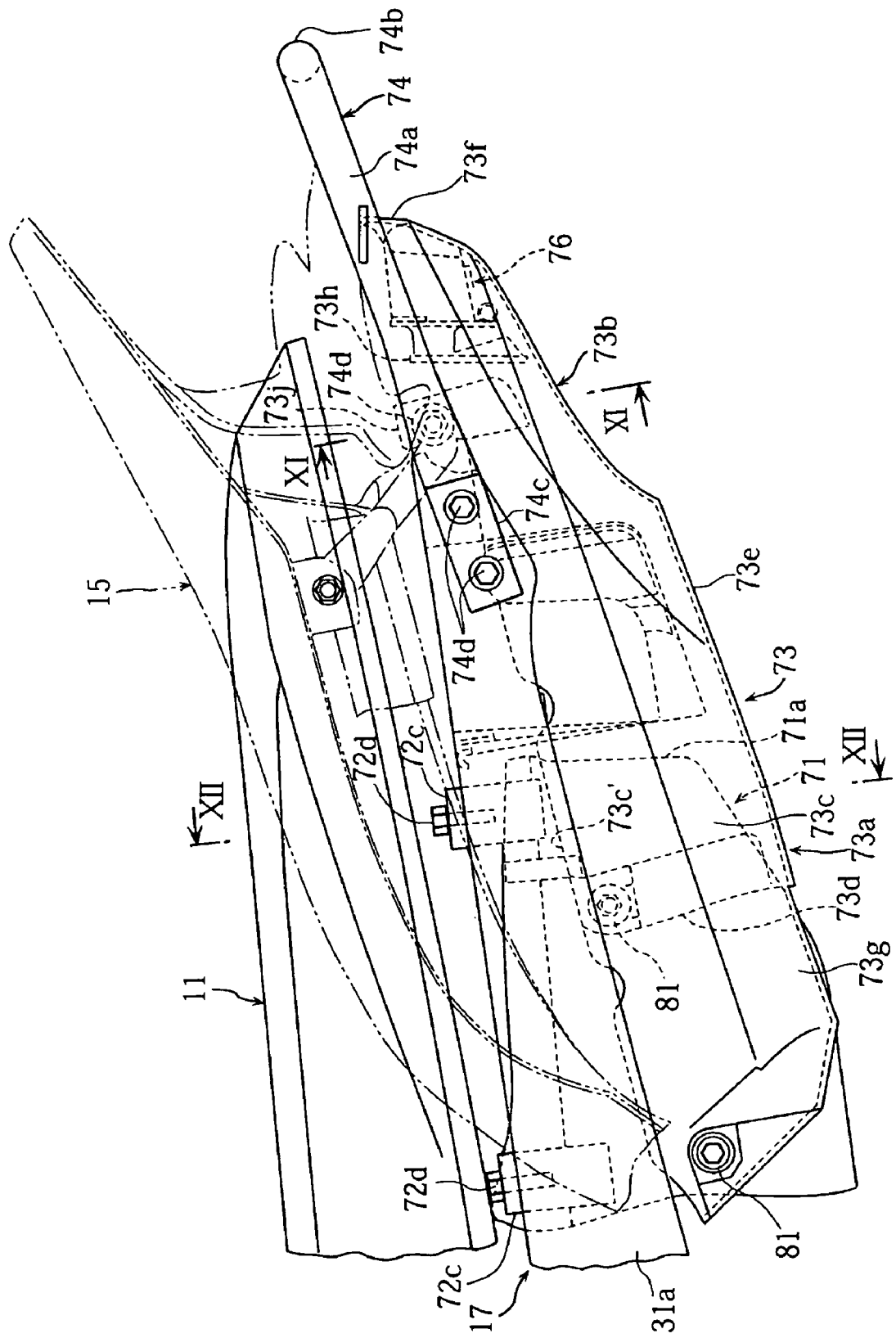
FIG. 10 is a side view of the undercover of the all terrain vehicle shown in FIG. 1.

As best shown in FIG. 10, an undercover 73 is provided below the air cleaner 71. The undercover 73 is preferably formed of a resin, and includes a case cover portion 73a for covering right, left and bottom surfaces of a rear portion of the air cleaner 71 and a rear extension portion 73b extending rearward from the case cover portion 73a for covering right, left, bottom and rear surfaces of the body of the all terrain vehicle 1, which is rearward of the air cleaner 71.

As shown in FIG. 12, the cross section of the undercover 73 taken along a plane crossing the axis (longitudinal direction) of the all terrain vehicle 1 preferably has a substantially C-shaped configuration which is open at an upper portion thereof, when viewed from behind. The undercover 73 includes left and right walls 73c and 73d, a bottom wall 73e, and a rear wall 73f (FIG. 10). As best shown in FIG. 12, top edges 73c' and 73d' of the left and right walls 73c and 73d of the undercover 73 are mostly inside the left and right rail main bodies 31a and 31b of the seat rail 17. When viewed from the side of the all terrain vehicle 1, the top edges 73c' and 73d' overlap the left and right rail main bodies 31a and 31b. When viewed in the cross section in FIG. 12, the left and right rail main bodies 31a and 31b each have a horizontal portion a and a vertical portion b extending downward from an outer edge of the horizontal portion a, the outer edge being outer in the width direction of the all terrain vehicle 1. The top edges 73c' and 73d' are each located below the corresponding horizontal portion a and inside the corresponding vertical portion b.

The case cover portion 73a is provided mainly for preventing rainwater or the like splashed upward from colliding with, and going up along, a rear wall 71a (FIG. 10) or left or right wall of the air cleaner 71, and thus flowing toward the opening 72f (FIG. 5) of the air introduction duct 72e. For this purpose, the left and right walls 73c and 73d and the bottom wall 73e of the case cover portion 73a extend forward from the rear wall 71a of the air cleaner 71 and cover the rear portion of the air cleaner 71 as shown in FIG. 10. The left wall 73c and a left portion of the bottom wall 73e of the case cover portion 73a extend further forward as compared to the right wall 73d. This extended portion will be referred to as an "extension portion 73g". Above the extension portion 73g, a control unit 75 (FIG. 6) for controlling the engine driving state and the like of the all terrain vehicle 1 in this preferred embodiment is provided. Since the extension portion 73g prevents rainwater or the like from colliding with the air cleaner 71, the rainwater or the like can be prevented, with certainty, from going up along the left portion of the air cleaner 71 and dropping on the control unit 75.

Figure 8:
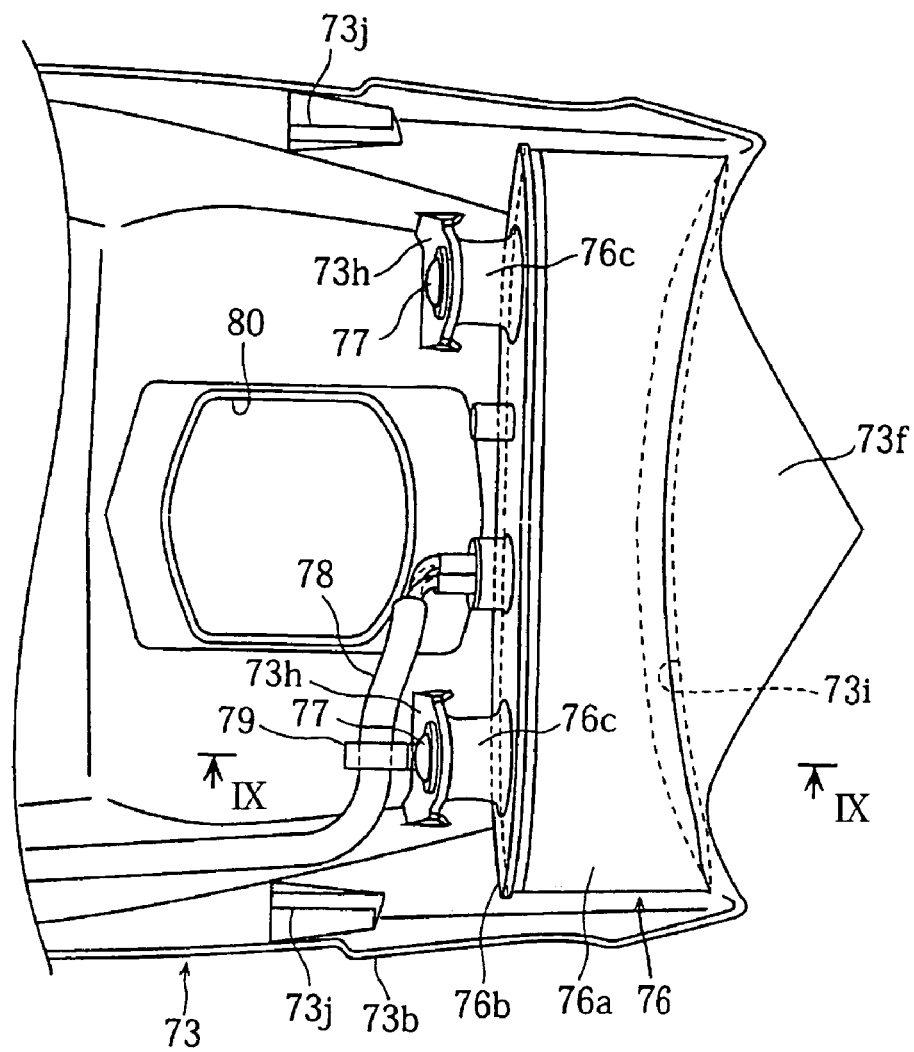
FIG. 8 is a plan view of a rear portion of an undercover of the all terrain vehicle shown in FIG. 1.
Figure 9:
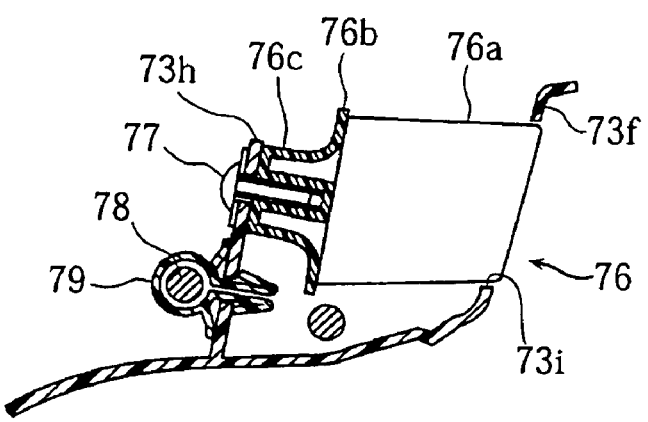
FIG. 9 is a cross-sectional view of the rear portion of the undercover of the all terrain vehicle shown in FIG. 1, taken along line IX-IX of FIG. 8.

Inside a rear portion of the rear extension portion 73b of the undercover 73, a tail light 76 is accommodated. As shown in FIG. 8, the tail light 76 preferably has a generally parallelepiped shape that is longer in the width direction of the all terrain vehicle 1. As shown in FIG. 8 and FIG. 9, the tail light 76 includes a lens 76a and a supporting plate 76b for supporting the lens 76a. On the supporting plate 76b, left and right supporting bosses 76c are formed so as to protrude in the opposite direction from the lens 76a. Each supporting boss 76c is tightened and fixed to a lamp bracket 73h, provided to stand on the undercover 73, by a bolt 77. The lens 76a is directed rearward through an opening 73i formed in the rear wall 73f of the undercover 73. Accordingly, when viewed from behind the all terrain vehicle 1, the lens 76a appears to be mounted on the rear wall 73f of the undercover 73. This structure can give an impression that the body of the all terrain vehicle 1 and the tail light 76 are integral and thus improves the external appearance.

Reference numeral 78 represents a cable for supplying electric power to the tail light 76. One of the lamp brackets 73h is engaged with a clip 79, and the cable 78 is supported by the clip 79. Reference numeral 80 represents a working hole formed in the bottom wall 73e (FIG. 11) of the undercover 73. Around the working hole 80, a substantially cylindrical wall extending upward from the bottom wall 73e is provided. As a result of such a structure, the bottom wall 73e is prevented from being reduced in rigidity by the formation of the working hole 80, and rainwater or the like is prevented from entering the working hole 80. The working hole 80 is effectively used when the tail light 76 is tightened and fixed to the lamp brackets 73h by the bolts 77.

Figure 11:
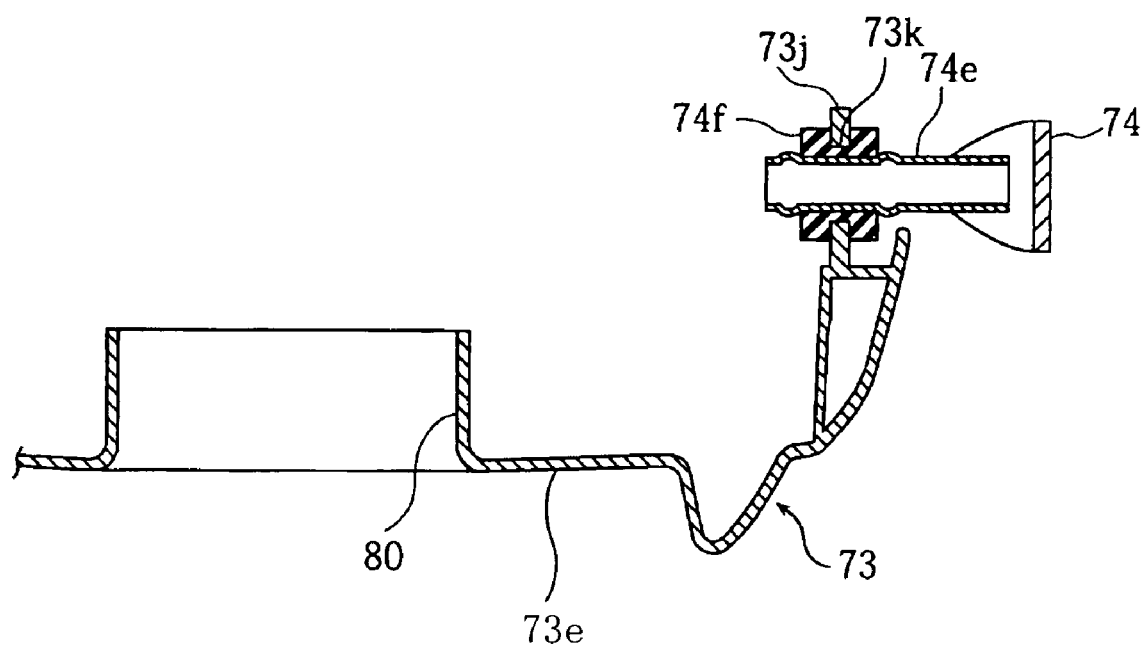
FIG. 11 is a cross-sectional view of the rear portion of the undercover taken along line XI-XI of FIG. 10 and viewed from behind.

The undercover 73 is attached to the body of the all terrain vehicle 1 as follows. As shown in FIG. 11, each of left and right stopping bosses 73j (only one stopping boss 73j is shown in FIG. 11) is provided in a rear portion of the undercover 73, and an engaging slit 73k of the stopping boss 73j is engaged with a grommet 74f provided on an engaging pipe 74e located behind the engaging slit 73k. Front edges of the left and right walls 73c and 73d of the undercover 73 are tightened and fixed to side walls of the case main body 72a of the air cleaner 71 by a bolt 81 (FIG. 10).

As shown in FIG. 6, a tool 82a, an air gauge 82b, and electric components such as a relay 82c, a fuse 82d and the like are provided between the rear portion 31c of the seat rail 17 and the rear wall 71a of the air cleaner 71. These vehicle-mounted components are accommodated in an accommodating box, and left, right and bottom surfaces of the accommodating box are surrounded by the undercover 73. Since the accommodating box is not seen from outside, the degree of freedom of arranging the vehicle-mounted components is increased and the undercover 73 of a simple shape improves the external appearance. The vehicle-mounted components are not limited to the components described in this preferred embodiment, and may be electric components including a battery and a control unit.

According to this preferred embodiment, the air cleaner 71 is located below the seat rail 17, which is located below the seat 11, so as to be positioned between the left and right rail main bodies 31a and 31b when viewed from above, and the left, right and bottom surfaces of the air cleaner 71 are covered with the undercover 73. Therefore, rainwater dropping from above and also rainwater or muddy water splashed from the rear wheels 5 can be prevented from entering an inner portion of the air cleaner 71. Since the muddy water or the like is prevented from going up along the side surfaces of the air cleaner 71 by covering the bottom surface of the air cleaner 71 with the undercover 73, the problem of the complicated structure which is caused by the labyrinth structure does not arise. In addition, since the left and right surfaces of the air cleaner 71 are covered with the undercover 73, the external appearance of the all terrain vehicle 1 when viewed from the side is improved.

The air cleaner 71 is supported by the left and right rail main bodies 31a and 31b, and the top edges 73c' and 73d' of the left and right walls 73c and 73d of the undercover 73 are located inside the left and right rail main bodies 31a and 31b so as to appear to overlap the left and right rail main bodies 31a and 31b when viewed from the side. Therefore, rainwater or muddy water can easily flow down along the left and right rail main bodies 31a and 31b and the undercover 73, and thus can be prevented more certainly from entering the inner portion of the air cleaner 71.

In the rear portion of the undercover 73, the rear extension portion 73b covering the right, left, bottom and rear surfaces of the rear portion of the body of the all terrain vehicle 1 is provided. Inside the rear extension portion 73b, the tail light 76 is accommodated. The lens 76a of the tail lamp 76 is directed rearward through the opening 73i formed in the rear wall 73f of the rear extension portion 73b. As a result of such a structure, rainwater or the like can be prevented from being splashed against electric lines of the tail light 76, and the area around the tail light 76 appears simple and neat so as to improve the external appearance.

To the rear portion of the seat rail 17, the rear bumper 74 is attached and arranged so as to surround the rear portion, and the rear extension portion 73b of the undercover 73 is attached to the rear bumper 74. Therefore, the rear portion of the undercover 73 can be supported by the rear bumper 74, which is originally provided for protecting the rear end portion of the body of the all terrain vehicle 1. Thus, an increase in the number of components can be avoided.

The tail light 76 is attached to the lamp brackets 73h which are preferably integrally formed with the rear extension portion 73b of the undercover 73. Such an arrangement eliminates the necessity of separately providing a supporting member for the tail light 76, and thus simplifies thus the attaching structure of the tail light 76. The above-described arrangement also makes it easy to positionally align the lens 76a of the tail light 76 and the opening 73i of the undercover 73. The reason is that the lamp brackets 73h are formed on the undercover 73 which has the opening 73i, and the tail light 76 is attached to the lamp brackets 73h.

The tool 82a and the electric components including the relay 83c are provided rearward with respect to the air cleaner 71 and forward with respect to the tail light 76, and are covered with the rear extension portion 73b of the undercover 73. Therefore, the tool and other electric components can be protected against rainwater and muddy water.

The left, right and bottom surfaces of the portion of the all terrain vehicle 1 from the air cleaner 71 to the tail light 76 are covered with one portion of the undercover 73. The top edges 73c' and 73d' of the left and right walls 73c and 73d of the undercover 73 are located inside the rail main bodies 31a and 31b in the width direction of the all terrain vehicle 1, and appear to overlap the rail main bodies 31a and 31b when viewed from the side of the all terrain vehicle 1. Therefore, rainwater or the like splashed from the rear wheels 5 is prevented from entering inside the undercover 73, and also the external appearance is improved.

The present invention is not limited to the above-described preferred embodiments, but various variations and modifications may be made without departing from the scope of the present invention. The presently disclosed preferred embodiments are therefore considered in all respects to be illustrative and not restrictive. The scope of the present invention is indicated by the appended claims rather than the foregoing description, and all changes which come within the meaning and range of equivalence thereof are intended to be embraced therein.

What is claimed is:

1. An all terrain vehicle, comprising:
   left and right rear wheels;
   a seat rail including left and right rail main bodies which are located between the left and right rear wheels when viewed from above;
   a seat arranged to cover a top surface of the seat rail;
   an air cleaner provided below the seat, and located between the left and right rail main bodies when viewed from above; and
   an undercover that is separate from the air cleaner and arranged to cover left, right, bottom and rear surfaces of the air cleaner; wherein
   the undercover is open at an upper portion thereof;
   the undercover includes a rear extension portion which is extended so as to cover left, right, bottom and rear surfaces of a rear portion of the body of the all terrain vehicle;
   the all terrain vehicle further includes a tail light accommodated inside the rear extension portion; and
   the rear extension portion includes a rear wall having a tail opening through which the tail light is arranged to extend in a rearward direction.

2. An all terrain vehicle according to claim 1, further comprising a rear bumper attached to a rear portion of the seat rail so as to surround the rear portion of the seat rail, wherein the undercover is attached to the rear bumper.

3. An all terrain vehicle according to claim 1, further comprising a lamp bracket that is integral with the undercover, wherein the tail light is attached to the lamp bracket.

4. An all terrain vehicle according to claim 1, further comprising an electric component provided rearward with respect to the air cleaner, wherein the undercover covers left, right and bottom surfaces of the air cleaner and the electric component.

5. An all terrain vehicle according to claim 1, wherein the air cleaner includes a generally parallelepiped box made of a resin and a filtering element.

6. An all terrain vehicle, comprising:
   left and right rear wheels;
   a seat rail including left and right rail main bodies which are located between the left and right rear wheels when viewed from above;
   a seat arranged to cover a top surface of the seat rail;

an air cleaner provided below the seat, and located between the left and right rail main bodies when viewed from above; and an undercover that is separate from the air cleaner and arranged to cover left, right, bottom and rear surfaces of the air cleaner; wherein the undercover is open at an upper portion thereof; and the seat includes a bottom plate having a groove extending along an edge thereof arranged to accommodate an inner wall of a rear fender so as to divert fluid away from the seat.

7. An all terrain vehicle according to claim 6, further comprising a muffler having an elliptical cross section which is longer in a horizontal direction than in a vertical direction.

8. An all terrain vehicle, comprising:

left and right rear wheels;

a seat rail including left and right rail main bodies which are located between the left and right rear wheels when viewed from above;

a seat arranged to cover a top surface of the seat rail;

an air cleaner provided below the seat, and located between the left and right rail main bodies when viewed from above; and an undercover that is separate from the air cleaner and arranged to cover left, right, bottom and rear surfaces of the air cleaner; wherein the undercover is open at an upper portion thereof;

the air cleaner is supported by the left and right rail main bodies;

the undercover includes left and right walls which are located inside the left and right rail main bodies and overlap the left and right rail main bodies when viewed from a side of the all terrain vehicle; and the undercover includes a bottom wall, and the left wall and a left portion of the bottom wall extend further forward than the right wall to define an extension portion.

9. An all terrain vehicle according to claim 8, wherein a control unit for controlling at least an engine driving state of the all terrain vehicle is located above the extension portion of the undercover.

10. An all terrain vehicle, comprising:

left and right rear wheels;

a seat rail including left and right rail main bodies which are located between the left and right rear wheels when viewed from above;

a seat arranged to cover a top surface of the seat rail;

an air cleaner provided below the seat and including an air cleaner case and a filtering element, the air cleaner being located between the left and right rail main bodies when viewed from above; and a splash shielding member that is separate from the air cleaner case and is attached to the left and right rail main bodies so as to surround the air cleaner at least; wherein the splash shielding member is an undercover that is arranged to cover left, right and bottom surfaces of the air cleaner.

11. An all terrain vehicle according to claim 10, wherein the undercover includes left and right walls which are located inside the left and right rail main bodies and overlap the left and right rail main bodies when viewed from a side of the all terrain vehicle.

12. An all terrain vehicle according to claim 10, wherein:

the undercover includes a rear extension portion which is extended so as to cover left, right, bottom and rear surfaces of a rear portion of the body of the all terrain vehicle;

the all terrain vehicle further includes a tail light accommodated inside the rear extension portion; and the rear extension portion includes a rear wall having a tail opening through which the tail light is arranged to extend in a rearward direction.

13. An all terrain vehicle according to claim 10, further comprising a muffler having an elliptical cross section which is longer in a horizontal direction than in a vertical direction.

14. An all terrain vehicle according to claim 10, wherein the undercover has a substantially C-shaped configuration which is open at an upper portion thereof, when viewed from behind.

15. An all terrain vehicle according to claim 12, further comprising a rear bumper attached to a rear portion of the seat rail so as to surround the rear portion of the seat rail, wherein the undercover is attached to the rear bumper.

16. An all terrain vehicle according to claim 12, further comprising a lamp bracket that is integral with the undercover, wherein the tail light is attached to the lamp bracket.

17. An all terrain vehicle according to claim 12, further comprising an electric component provided rearward with respect to the air cleaner, wherein the undercover covers left, right and bottom surfaces of the air cleaner and the electric component.

* * * * *